US009652217B2

(12) United States Patent
Winkler et al.

(10) Patent No.: US 9,652,217 B2
(45) Date of Patent: May 16, 2017

(54) ELECTRIC TOOL

(71) Applicant: Robert Bosch GmbH, Stuttgart (DE)

(72) Inventors: Thomas Winkler, Stuttgart (DE); Ulli Hoffmann, Niefern-Oeschelbronn (DE); Klaus Kuespert, Leinfelden-Echterdingen (DE); Klaus Marx, Stuttgart (DE); Carsten Diem, Ludwigsburg (DE); Jan Breitenbach, Stuttgart (DE); Juergen Lennartz, Ostfildern (DE); Ulrich Schulmeister, Bietigheim-Bissingen (DE); Christian Bertsch, Markgroeningen (DE); Achim Duesselberg, Kirchheim Unter Teck (DE); Helge Sprenger, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/403,204

(22) PCT Filed: Apr. 3, 2013

(86) PCT No.: PCT/EP2013/056978
§ 371 (c)(1),
(2) Date: Nov. 24, 2014

(87) PCT Pub. No.: WO2013/174556
PCT Pub. Date: Nov. 28, 2013

(65) Prior Publication Data
US 2015/0135306 A1    May 14, 2015

(30) Foreign Application Priority Data

May 25, 2012 (DE) .......... 10 2012 208 919
Nov. 30, 2012 (DE) .......... 10 2012 221 997

(51) Int. Cl.
*G06F 9/44* (2006.01)
*G06F 9/445* (2006.01)
(Continued)

(52) U.S. Cl.
CPC .............. *G06F 8/65* (2013.01); *B25F 5/00* (2013.01); *G05B 19/4185* (2013.01);
(Continued)

(58) Field of Classification Search
CPC . G06F 8/65; G06F 12/00; H04L 63/10; H04L 67/10; G25F 5/00; G05B 19/4185; H04W 12/06
See application file for complete search history.

(56) References Cited

U.S. PATENT DOCUMENTS 5,859,778 A * 1/1999 Kuroda ............... D06F 33/02
700/169
6,453,687 B2 * 9/2002 Sharood ............... G05B 19/00
62/127
(Continued)

FOREIGN PATENT DOCUMENTS

CN    101815324 A    8/2010
CN    101890691 A    11/2010
(Continued)

OTHER PUBLICATIONS

International Search Report corresponding to PCT Application No. PCT/EP2013/056978, mailed Sep. 24, 2013 (German and English language document) (7 pages).

*Primary Examiner* — Taghi Arani
*Assistant Examiner* — Sharon Lynch
(74) *Attorney, Agent, or Firm* — Maginot, Moore & Beck LLP

(57) ABSTRACT

The disclosure relates to an electric tool, particularly a hand-held power tool, comprising a control unit which has
(Continued)

control software with control parameters, and is provided for the purpose of controlling a drive unit. According to the disclosure, said electric tool comprises an interface unit that is provided to fundamentally update and/or modify the control software and/or the control parameters.

13 Claims, 4 Drawing Sheets

(51) Int. Cl.
*B25F 5/00* (2006.01)
*G06F 12/00* (2006.01)
*G05B 19/418* (2006.01)
*H04L 29/06* (2006.01)
*H04L 29/08* (2006.01)

(52) U.S. Cl.
CPC .............. *G06F 12/00* (2013.01); *H04L 63/10* (2013.01); *H04L 67/10* (2013.01); *H04L 67/12* (2013.01)

(56) References Cited

U.S. PATENT DOCUMENTS

| | | | | |
|---|---|---|---|---|
| 7,072,945 | B1* | 7/2006 | Nieminen | G08C 17/02 455/41.2 |
| 7,164,956 | B2* | 1/2007 | Bicknell | G07F 9/026 62/127 |
| 7,493,651 | B2* | 2/2009 | Vanska | G07C 9/00309 726/2 |
| 7,634,565 | B2* | 12/2009 | Goffin | H04L 63/10 709/225 |
| 8,412,179 | B2* | 4/2013 | Gerold | B25C 1/08 318/114 |
| 8,468,065 | B2* | 6/2013 | Han | G06Q 20/10 700/17 |
| 2002/0050364 | A1* | 5/2002 | Suzuki | B25B 21/02 173/1 |
| 2002/0103850 | A1* | 8/2002 | Moyer | H04L 29/06027 709/202 |
| 2002/0131569 | A1* | 9/2002 | Ito | H04L 12/2803 379/102.03 |
| 2002/0134811 | A1 | 9/2002 | Napier et al. | |
| 2002/0198975 | A1* | 12/2002 | Bogia | H04L 41/0886 709/223 |
| 2003/0081745 | A1* | 5/2003 | Ito | H04L 12/2803 379/102.03 |
| 2003/0210126 | A1* | 11/2003 | Kanazawa | G07C 9/00142 340/5.5 |
| 2004/0067736 | A1* | 4/2004 | Kamma | H04W 12/06 455/41.2 |
| 2004/0109548 | A1* | 6/2004 | Ito | H04L 12/2803 379/102.03 |
| 2004/0144552 | A1* | 7/2004 | Suzuki | B25B 21/02 173/2 |
| 2004/0172396 | A1* | 9/2004 | Vanska | G07C 9/00309 |
| 2004/0267383 | A1* | 12/2004 | Bicknell | G07F 9/026 700/65 |
| 2005/0197115 | A1* | 9/2005 | Clark | B23K 9/0953 455/426.1 |
| 2006/0103545 | A1* | 5/2006 | Tsou | G08C 17/02 340/12.29 |
| 2007/0216516 | A1* | 9/2007 | Ghabra | G07C 9/00182 340/5.64 |
| 2008/0207267 | A1* | 8/2008 | Gose | H04W 4/02 455/557 |
| 2009/0254203 | A1* | 10/2009 | Gerold | B25C 1/08 700/87 |
| 2012/0007748 | A1 | 1/2012 | Forgues et al. | |
| 2013/0176107 | A1* | 7/2013 | Dumas | G07C 9/00571 340/5.61 |

FOREIGN PATENT DOCUMENTS

| | | |
|---|---|---|
| DE | 20 2006 014 606 U1 | 2/2007 |
| DE | 10 2008 000 973 A1 | 10/2009 |
| DE | 10 2010 029 729 A1 | 12/2011 |
| EP | 1 559 511 A2 | 8/2005 |
| GB | 2 301 912 A | 12/1996 |

* cited by examiner

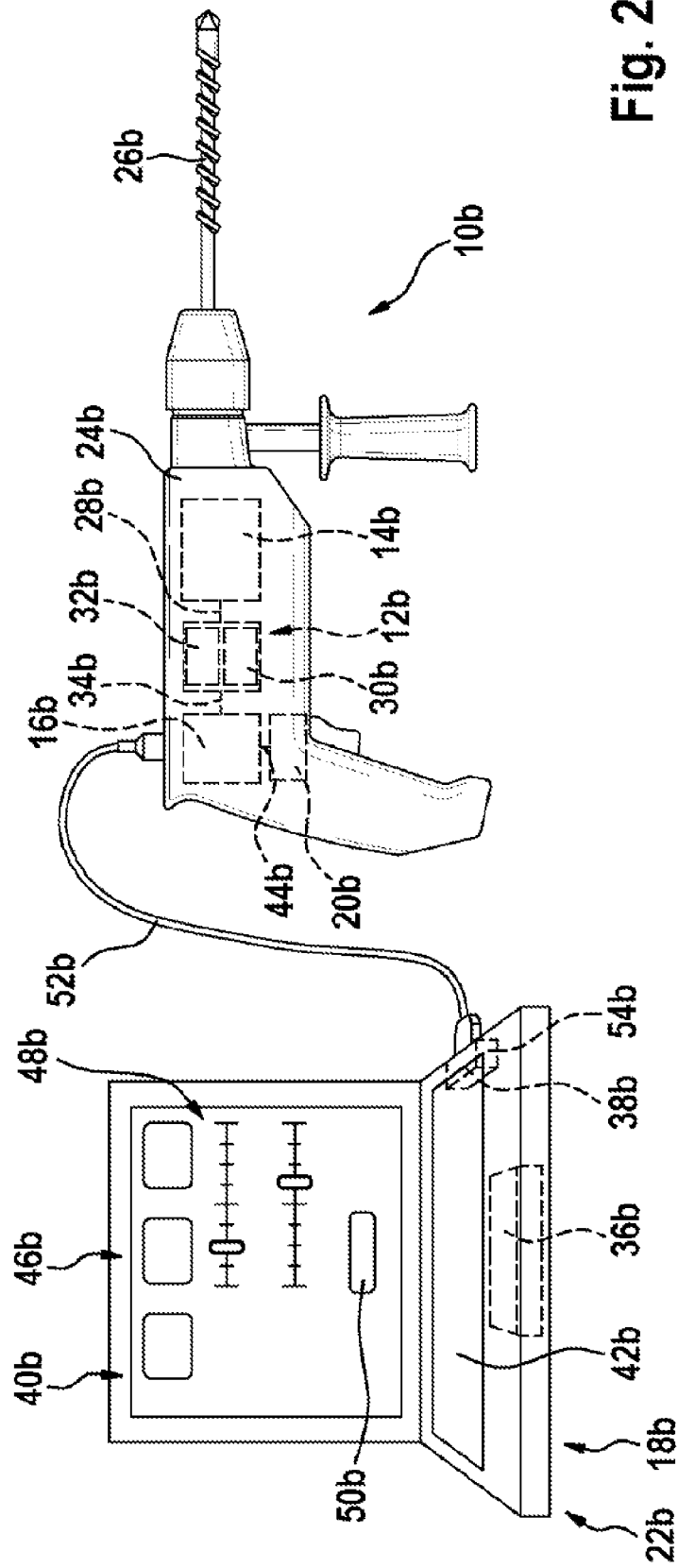

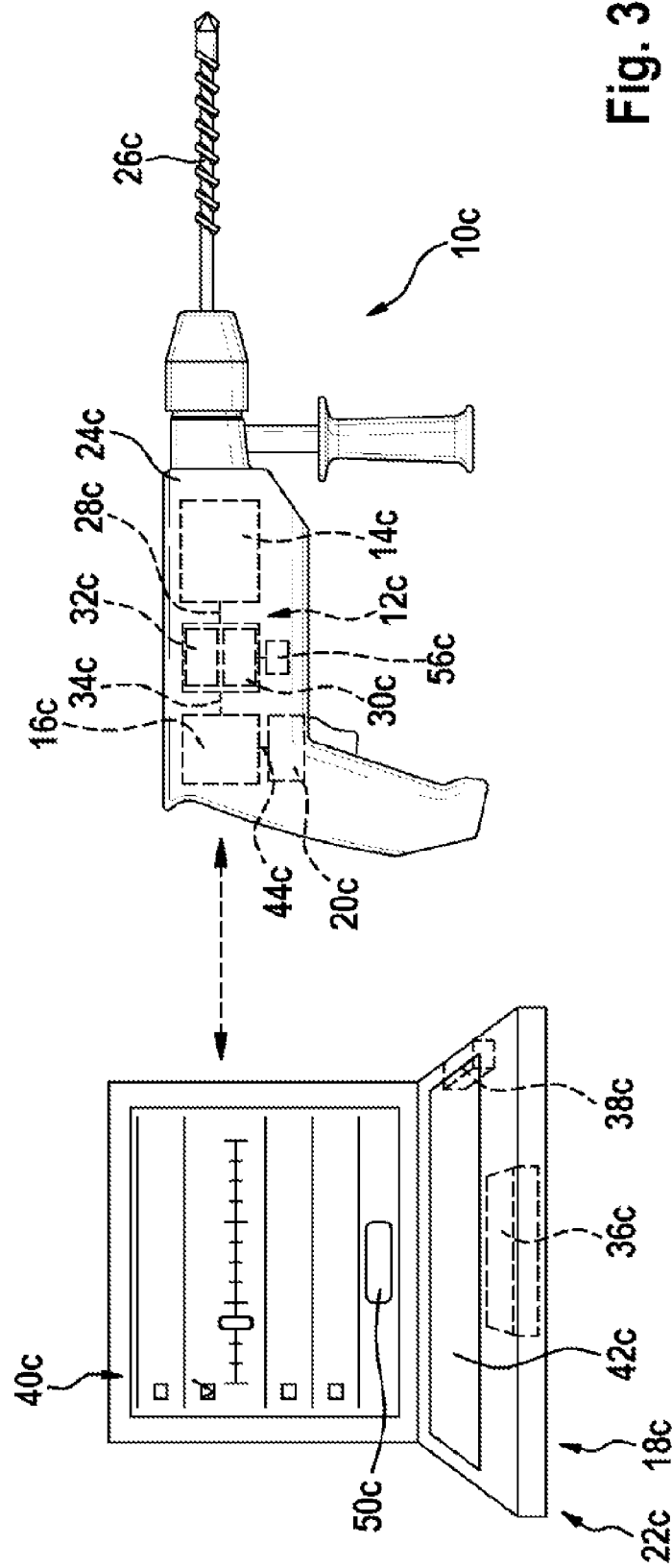

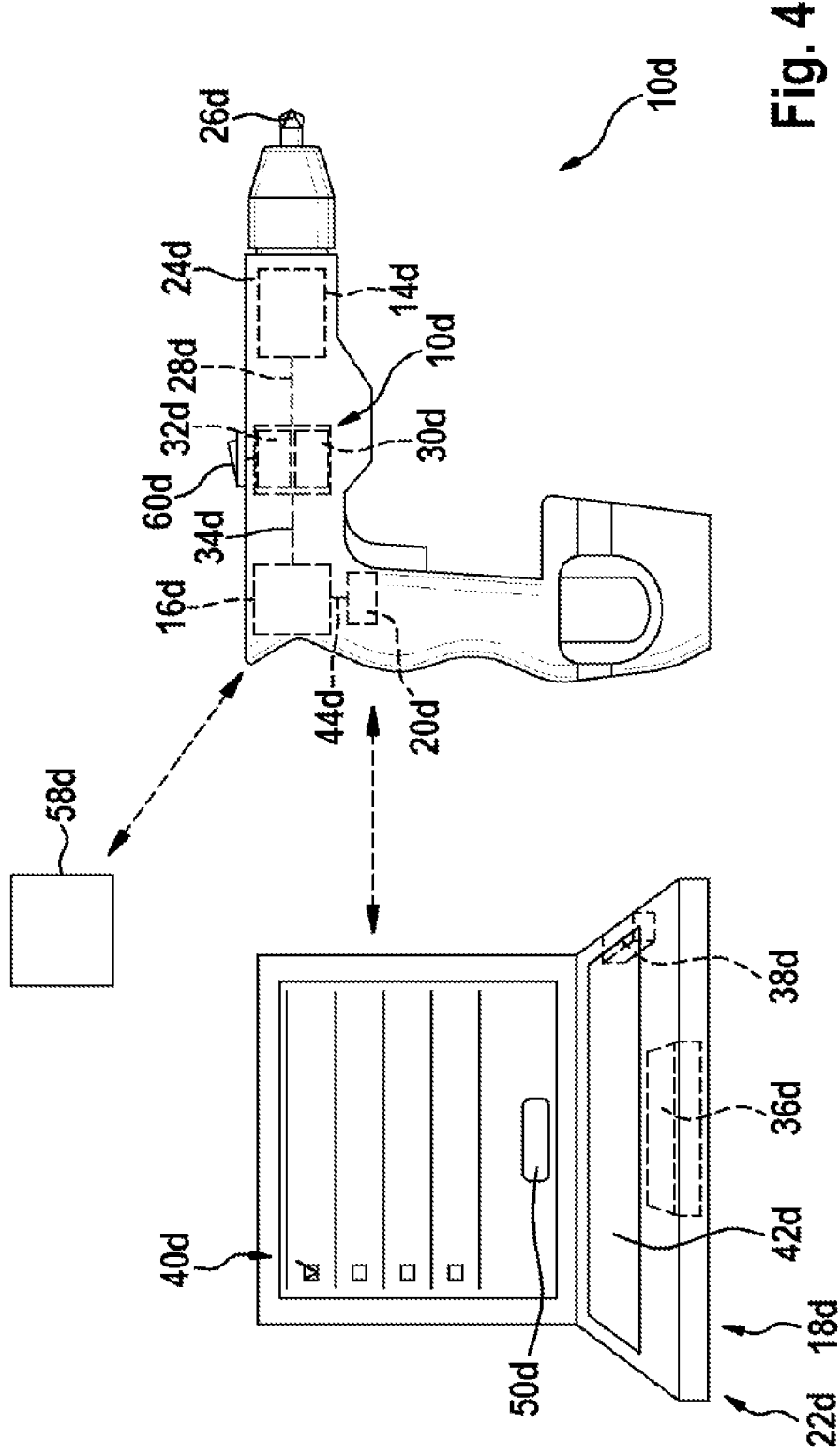

ELECTRIC TOOL

This application is a 35 U.S.C. §371 National Stage Application of PCT/EP2013/056978, filed on Apr. 3, 2013, which claims the benefit of priority to Serial Nos. DE 10 2012 208 919.5 and DE 10 2012 221 997.8, filed on May 25, 2012 and Nov. 30, 2012, respectively, in Germany, the disclosures of which are incorporated herein by reference in their entirety.

BACKGROUND

An electric tool in particular a hand-held power tool having a control unit that has control software and said control software having control parameters and said control unit is provided to control a drive unit has been previously proposed.

SUMMARY

The disclosure is based on an electric tool in particular on a hand-held power tool having a control unit that has control software and said control software having control parameters and said control unit is provided to control a drive unit.

It is proposed that the electric tool comprises an interface unit that is provided for the purpose of fundamentally updating and/or modifying the control software and/or control parameters. The term an "electric tool" is to be understood to mean in this context in particular a tool having at least one electronic unit. The term an "electronic unit" in this case is to be understood to mean in particular a unit that influences an electric current in a gas, in a conductor, in a vacuum and/or advantageously in a semiconductor. It is preferred that the electronic unit comprises at least one transistor, particularly preferably at least one microprocessor and/or at least one other electronic component that appears expedient to the person skilled in the art. In addition, the term "hand-held power tool" is to be understood to mean in this context in particular a hand-operated tool that is driven by a drive system such as in particular a motor. It is preferred that said term is understood to mean in particular a machine that processes a work piece, but advantageously a drill, a drill and/or impact hammer, a saw, a plane, a power screwdriver, a milling machine, a grinder, an angle grinder, a gardening tool and/or a multifunctional tool. Furthermore, the term a "control unit" is to be understood to mean in particular in this context a unit for the purpose of performing a control routine and/or a regulating routine and said control unit has at least one control device. The term a "control unit" is to be understood to mean in particular a unit having a processor unit and having a storage unit and also in particular having an operating system that is stored in the storage unit. Fundamentally, it is possible for the control unit to comprise multiple control devices that are mutually connected and are preferably provided for the purpose of communicating with one another by way of a system such as in particular a bus system. Furthermore, the term "control software" is to be understood to mean in this context in particular software that forms at least one part of an operating system and/or software for the operating system. It is preferred that the control software is provided for the purpose of being implemented on at least one processor. It is particularly preferred that the control software comprises at least one regulating routine, control routine and/or calculating routine. In addition, the term a "control parameter" is to be understood to mean in this context in particular a characteristic number and/or a characteristic value of at least one unit of the electric tool that is at least in part controlled by the control unit. Various parameters that appear expedient to the person skilled in the art are feasible, but in this context said parameters are to be understood to be operating parameters, such as by way of example a rotational speed, an impact speed, a torque and/or a control rate. The term a "drive unit" is to be understood to mean in this context a motor unit. It is preferred that the term a "drive unit" is to be understood to mean in particular an electric and/or mechanical and/or pneumatic motor unit that is provided to advantageously generate a rotary movement in an operation. Advantageously, the term is understood to mean in particular an electric motor. The term an "interface unit" is to be understood to mean in this context in particular a unit that is provided for the purpose of exchanging data. In particular, the interface unit comprises at least one information input and at least one information output. It is preferred that an information flow of the interface unit is embodied in a bidirectional manner. It is preferred that the interface unit is provided for the purpose of being connected to at least one physical system, wherein the system is connected to both an information input as well as to an information output of the interface unit. It is particularly preferred that said term is understood to mean an interface unit between at least two physical systems, such as in particular between the electric tool and at least one or multiple devices of the outside world. Various interface units that appear expedient to the person skilled in the art are feasible but said term is to be understood to mean in this context in particular a wireless interface such as by way of example Bluetooth, WLAN, UMTS, NFC (near field communication), GSM (global system for mobile communications) or an optical interface, a wire-connected interface such as by way of example a USB-connector and/or a disk drive interface by means of a storage medium such as by way of example a memory card, a memory stick or a CD. The term an "optical interface" is to be understood to mean in this context in particular an optical sensor that is provided for the purpose of receiving and/or reading-out an optical signal. It is preferred that the sensor is provided for the purpose of receiving and/or reading-out a coded signal, in particular by way of flickering a light source such as in particular a light emitting diode. Various optical sensors that appear expedient to the person skilled in the art are feasible, but said term is to be understood to mean in this context in particular a photodiode and/or a phototransistor and/or other bidirectional or unidirectional optical sensors. In addition, the term "to fundamentally update and/or to modify" is to be understood to mean in this context in particular a process of updating and/or modifying that directly effects an operation of the electric tool. It is preferred that said term is understood to mean in particular a process of updating and/or modifying that replaces and/or displaces at least one previously existing stored operating parameter of the control parameters, preferably at least two previously existing stored operating parameters of the control parameters and particularly preferably at least a large part of previously existing stored operating parameters of the control parameters. In this case, the term a "large part of the operating parameters" is to be understood to mean in particular at least 50%, preferably at least 55% and particularly preferably at least 60% of the operating parameters.

As a result of the embodiment in accordance with the disclosure of the electric tool, the electric tool can be optimized for various applications. In addition, it is possible to fundamentally update and/or modify the control software and/or the control parameters without disassembling the tool. The term "without disassembling the tool" is to be understood to mean in this context in particular that it is possible to fundamentally update and/or modify the control software and or the control parameters without disassembling the tool and/or without exchanging components. It is preferred that the term "without disassembling the tool" is in particular understood to mean that it is necessary to unscrew and/or screw in fewer than 6 screws, preferably fewer than 4 screws and particularly preferably fewer than two screws.

It is further proposed that the interface unit is provided for the purpose of connecting the control unit to an external programming unit. Fundamentally, it would however also be feasible for the interface unit to be embodied as a direct interface to a user in the form of a user unit and/or as an interface to an exchangeable component. The term "provided" is to be understood to mean in particular specifically programmed, designed and/or equipped. In addition, the term "external programming unit" is to be understood to mean in this context in particular a unit having a data processing unit and having at least one data transmission unit. The term "data processing unit" is to be understood to mean in particular a unit having an information input, an information processor and an information output. Advantageously, the data processing unit comprises at least one processor, a storage unit, input and output means, further electrical components, an operating program, regulating routines, control routines and/or calculating routines. It is preferred that the components of the data processing unit are arranged on a common circuit board and/or advantageously in a common housing. Furthermore, the term a "data transmission unit" is to be understood to mean in particular a unit that is provided for the purpose of transmitting data. A transmission can be both wireless and/or wire-connected. It is preferred that the data transmission unit is provided to send data. As a consequence, it is possible to adjust and/or update the electric tool from the exterior in an advantageous manner. In addition, a number of components of the electric tool can be kept to a minimum.

Fundamentally, it would be feasible that the interface is formed by a setting element at which a user can perform on the electric tool stored modifications to the control software of the control unit. Various setting elements that appear expedient to the person skilled in the art are feasible such as by way of example a rotary switch and/or at least one jumper that can be inserted and/or removed. Advantageously, the at least one jumper is arranged behind a cover of a housing of the electric tool. As a consequence, a modification can be performed directly on the device.

It is further proposed that the interface unit is provided for the purpose of producing a wireless connection to the external programming unit. Various wireless connections that appear expedient to the person skilled in the art are feasible, in particular said connection is to be understood to mean a radio connection and/or an optical connection. As a consequence, it is possible to produce a connection in a particularly rapid and simple manner. In addition, interfaces that lie on the outside such as in particular plug sockets and/or plugs can be avoided, said interfaces being susceptible to damage and/or dirt.

In addition, it is proposed that the electric tool comprises at least one security device that is provided for the purpose of authorizing a use of an interface unit. The term "security device" is to be understood to mean in this context in particular a device that in the case of an external access of a unit to the interface unit monitors an access right of the unit and furthermore blocks and/or releases the interface unit. An access right in this case can be achieved in particular by way of a signature in software of the unit and/or by way of a signature in the data that is to be transmitted and/or by way of a code that is to be input. It is preferred that as a consequence an authorization is only achieved for end users, for specialist dealers, for service personnel during servicing and/or for other personnel who appear expedient to the person skilled in the art. As a consequence, it can be advantageously achieved that it is only possible for people that are authorized by a manufacturer to fundamentally update and/or modify the control software and/or the control parameters of the control unit and/or to perform other modifications. By way of example, it would as a consequence be possible that a user takes his electric tool to an authorized specialist dealer and said specialist dealer sets the electric tool according to the wishes of the user by way of an external programming unit with an electric tool application.

Furthermore, it would be feasible that an authorization is performed in a graded manner by means of the security device. It is preferred that the security device for this purpose comprises various authorization grades that are allocated various groups of persons. The term "authorization grades" is to be understood to mean in this context in particular staggered authorization access rights. It is preferred that each authorization grade is allocated in each case authorization access rights whose freedoms increase with each higher grade. It is particularly preferred that each authorization grade is allocated in each case groups of persons that in each case are authorized. As a consequence, rights for the purpose of using the interface unit can be limited and released on a person-specific basis in an advantageous manner. As a consequence, it would be feasible by way of example that an end user is only permitted to perform insignificant modifications to the control software and/or the control parameters, and that service personnel are permitted to perform wide ranging modifications to the control software and/or the control parameters.

Furthermore, it is preferred that the control unit is provided for the purpose of processing and/or implementing received user-defined regulating variables. The term "received regulating variables" is to be understood to mean in this context in particular the regulating variables that are received by the interface unit and are forwarded to the control unit. In addition, the term "user-defined regulating variables" is to be understood to mean in this context in particular values that are provided by a user and are in direct operative connection with the control parameters of the electric tool. Various regulating variables that appear expedient to the person skilled in the art are feasible such as by way of example the level of aggression and/or impact energy. The term "level of aggression" is understood to mean in this context in particular a response characteristic or rather a reaction time of the electric tool, in other words the time that by way of example a tool of the electric tool requires until it moves from a standby mode up to a desired rotational speed and/or a desired impact speed. In addition, the term "to implement" is understood to mean in this context embedding in an existing control software and/or replacing parts of the control software. As a consequence, it is possible to set the control unit in an advantageous and particularly accurate manner, whereby the electric tool can be adjusted.

In this regard it would be feasible for the electric tool to comprise a setting element by way of which it is possible to modify at least one control parameter. It is preferred that it would be feasible to establish an output value of the control parameter by means of the control parameters that are implemented in the control unit and the control parameter can be only temporarily set by way of the setting element. The term "temporary" is to be understood to mean in particular until the next process of unplugging and/or switching off.

Furthermore, it is proposed that the control unit is provided for the purpose of processing and/or implementing received, user-defined data regarding a specific application of the tool. Various specific applications of the tool that appear expedient to the person skilled in the art are feasible, but in particular said term is to be understood to mean specific basic materials such as by way of example tiling, concrete, wood etc., specific tools such as by way of example drills, flat heads, screw taps, channel chisels etc., and/or specific tasks such as by way of example tamping, hammering, chiseling, drilling etc. By way of example, in the case of a specific tiling mode, in particular for drill hammers, control parameters can be set for a regulating routine in such a manner that while moving from idling to impact speed, the impact speed in comparison to a basic setting can be achieved particularly rapidly with a balanced impact energy and reaction time. As a consequence, the electric tool can be advantageously and rapidly adjusted to various applications. In addition, as a consequence, an optimal adjustment is also possible without a user having specific knowledge of regulating variables and/or parameters.

It is further proposed that the control unit is provided for the purpose of processing and/or implementing received, user-defined data regarding an environmental condition. Various environmental conditions that appear expedient to the person skilled in the art are feasible such as in particular ambient pressure, ambient temperature, ambient moisture and/or work height over base height level. As a consequence, it is advantageously possible to take into account particular environmental conditions without additional sensor technology by means of the electric tool. In addition, it is possible to implement and consider particular working conditions in addition to a design scope of the electric tool such as by way of example working at great heights.

It is further proposed that the control unit is provided for the purpose of processing and/or implementing received, user-defined and/or user-specific data regarding a tool behavior. The term "tool behavior" is to be understood to mean in this context in particular a behavior of the electric tool having direct effects on a user. Various tool behaviors that appear expedient to the person skilled in the art are feasible, but in particular said term is to be understood to mean an "aggressive" behavior, a behavior having high impact energy and or a low vibration behavior. The term an "aggressive behavior" is to be understood to mean a behavior having a rapid reaction time of the electric tool in relation to achieving a desired rotational speed. The "aggressive behavior" can be used by way of example while striking off tiles. The "behavior having high impact energy" can be used by way of example while drilling into reinforced concrete. The "low vibration behavior" can be used by way of example by users who are sensitive to noise and/or by users with illnesses, such as by way of example Raynaud's phenomenon and/or Raynaud's syndrome. As a consequence, it can be achieved in particular that the electric tool can be set to the wishes of a user. In addition, as a consequence, it is possible to set said tool rapidly without a user having specific knowledge of regulating variables and/or parameters.

In addition, a method is proposed for fundamentally updating and/or modifying control software and/or control parameters of a control unit of an electric tool.

Furthermore, it is proposed in relation to the method that user-defined and/or user-specific data that is input into an external programming unit and/or regulating variables for the control unit of the electric tool can be transmitted directly or indirectly to the control unit of the electric tool. The term "directly or indirectly" is to be understood to mean in this context in particular that the data and/or regulating variables are transmitted directly or by way of a further different unit and/or in modified form to the control unit. As a consequence, it is possible to achieve a particularly simple execution in an advantageous manner since the data and/or regulating variables are transmitted by the external programming unit.

Furthermore, it is proposed in relation to the method that user-defined and/or user-specific data for the control unit of the electric tool is processed into regulating variables for the control unit of the electric tool by way of the external programming unit. It is preferably proposed in relation to the method that user-defined and/or user-specific data for the control unit of the electric tool is processed into parameters for the control unit of the electric tool by way of the external programming unit. In other words, that the data that is not directly related to the electric tool but is understandable and obvious to a user is processed in parameters and/or regulating variables that are, however, not understandable for a user. It follows from this that, as a consequence, it can in particular be achieved that it is only necessary for a user to input data for his application of the tool and/or his environmental conditions and/or his desired tool behavior and additional know-how is not required. In addition, a data processing capacity of the electric tool can as a consequence be kept to a minimum since a data processing process is assumed by the external programming unit.

In addition, an external programming unit for the purpose of implementing the method is proposed. It is preferred that the external programming unit comprises for this purpose in particular a program. The program can by way of example be formed by an application, or "app" for short, or other software.

It is proposed that the external programming unit is embodied as a portable data processing system. Various portable data processing systems are feasible but said term is to be understood to mean in particular a laptop, a notebook, a netbook, a tablet-PC and/or a smartphone. As a consequence, it is possible in particular to provide a particularly manageably sized external programming unit. However, it would fundamentally also be feasible for the external programming unit to be formed by a desktop computer.

BRIEF DESCRIPTION OF THE DRAWINGS

Further advantages are evident in the following description of the drawing. Four exemplary embodiments of the disclosure are illustrated in the drawings. The drawings, the description and the claims include numerous features in combination. The person skilled in the art will also expediently consider the features individually and combine them to form further expedient combinations.

In the drawings:

FIG. 2 illustrates an alternative electric tool in accordance with the disclosure and an alternative external programming unit in accordance with the disclosure in a schematic illustration, FIG. 3 illustrates a further alternative electric tool in accordance with the disclosure and a further alternative external programming unit in accordance with the disclosure in a schematic illustration, FIG. 4 illustrates a further alternative electric tool in accordance with the disclosure and a further alternative external programming unit in accordance with the disclosure in a schematic illustration.

DETAILED DESCRIPTION

Figure 1:
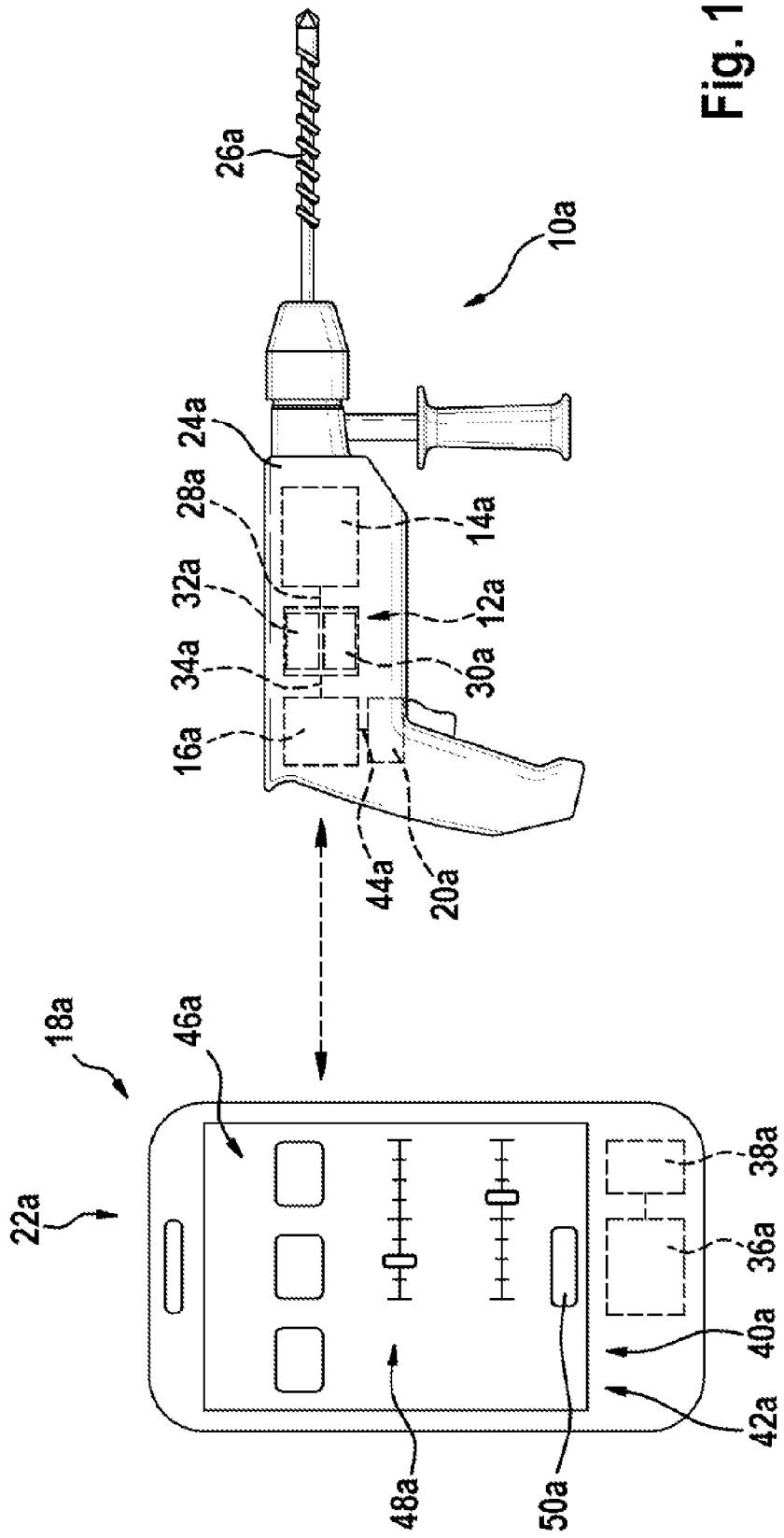
FIG. 1 illustrates an electric tool in accordance with the disclosure and an external programming unit in accordance with the disclosure in a schematic illustration.

The electric tools 10a, 10b, 10c, 10d and programming units 18a, 18b, 18c, 18d that are illustrated in FIGS. 1 to 4 are only illustrated in a simplified manner, in particular with regard to size in relation to one another.

FIG. 1 illustrates an electric tool 10a in accordance with the disclosure having a control unit 12a that has control software and said control software having control parameters. The electric tool 10a is formed by a hand-held power tool. The electric tool 10a comprises a housing unit 24a and a tool 26a. The control unit 12a is provided for the purpose of controlling a drive unit 14a. The control unit 12a is connected to the drive unit 14a by way of a line 28a. In addition, the control unit 12a is arranged within the housing unit 24a of the electric tool 10a. The control unit 12a comprises a processor unit 30a and a memory unit 32a. Furthermore, the electric tool 10a comprises an interface unit 16a that is provided for the purpose of fundamentally updating and/or modifying the control software and/or the control parameters. The interface unit 16a is arranged within the housing unit 24a of the electric tool 10a. In addition, the interface unit 16a is connected to the control unit 12a of the electric tool 10a by way of a line 34a.

The interface unit 16a is provided for the purpose of connecting the control unit 12a to an external programming unit 18a. The interface unit 16a is provided for the purpose of producing a wireless connection to the external programming unit 18a. The external programming unit 18a is formed by a portable data processing system 22a. The external programming unit 18a is formed by a smartphone. The external programming unit 18a comprises a data processing unit 36a, a data transmission unit 38a and a display 40a. The display 40a is formed by a touch screen and is used therefore in part as an input unit 42a.

The electric tool 10a comprises a security device 20a that is provided for the purpose of authorizing a use of the interface unit 16a. The security device 20a is connected to the interface unit 16a by way of a line 44a. The security device 20a monitors incoming data at the interface unit 16a. In the case of the incoming data, the security device 20a monitors whether said data comprises a signature that is known by the security device 20a. If the data signature is not known, the data is discarded and is not relayed to the control unit 12a. If the data comprises a known signature, the data is relayed to the control unit 12a.

The control unit 12a is provided for the purpose of processing and implementing received, user-defined regulating variables. If regulating variables that are received by the interface unit 16a are relayed to the control unit 12a, the control unit 12a determines control parameters of the control unit 12a that correspond to the received regulating variables. The process of determining the control parameters is performed by way of a characteristic field in which a regulating variable is allocated to a control parameter. However, it is fundamentally also feasible that the process of determining the control parameters is performed by way of an algorithm. The determined control parameters are implemented in the memory unit 32a. During the implementation process, previously existing control parameters are at least in part replaced by means of the determined control parameters.

The control unit 12a is provided for the purpose of processing and implementing received, user-defined data regarding a specific application of the tool. The regulating variables that are stored for a specific purpose are sent by the external programming unit 18a to the electric tool 10a. The stored regulating variables of the user-defined data regarding a specific application of the tool is processed and subsequently implemented as control parameters by the control unit 12a.

The control unit 12a is provided for the purpose of processing and implementing received, user-defined data regarding an environmental condition. The regulating variables that relate to an environmental condition and are stored or rather derived from said environmental condition are sent to the electric tool 10a by the external programming unit 18a. The stored regulating variables relating to the user-defined data regarding an environmental condition are processed and subsequently implemented as control parameters by the control unit 12a.

The control unit 12a is provided for the purpose of processing and implementing received, user-defined and/or user-specific data regarding a tool behavior. The stored regulating variables relating to the tool behavior are sent to the electric tool 10a by the programming unit 18a. The stored regulating variables relating to the user-defined and/or user-specific data regarding a tool behavior is processed and subsequently implemented as control parameters by the control unit 12a.

The external programming unit 18a is provided for the purpose of implementing a method. The method is provided for the purpose of fundamentally updating and/or modifying control software and/or control parameters of the control unit 12a of the electric tool 10a. In the method, user-defined and/or user-specific data that is input into the external programming unit 18a and regulating variables for the control unit 12a of the electric tool 10a are transmitted to the control unit 12a of the electric tool 10a by way of the interface unit 16a. In the method, the user-defined and/or user-specific data and regulating variables that are input into the display 40a of the external programming unit 18a for the control unit 12a of the electric tool 10a are sent to the interface unit 16a and further to the control unit 12a of the electric tool 10a during the course of confirming the input by way of the data transmission unit 38a. In addition, in the method, user-defined and/or user-specific data for the control unit 12a of the electric tool 10a is processed by way of the external programming unit 18a into regulating variables for the control unit 12a of the electric tool 10a. It follows from this that the user-defined and/or user-specific data is also always transmitted as regulating variables to the control unit 12a of the electric tool 10a.

Various setting possibilities are illustrated on the display 40a of the external programming unit 18a for a user. Option fields 46a for pre-settings are arranged in an upper region of the display 40a. The option fields 46a can be selected by means of touch. In each case, pre-set regulating variables are stored in each option field 46a. Specific applications of the tool, environmental conditions and tool behaviors can be selected by way of the option fields 46a. At least one of the option fields 46a comprises at least one text field that is not further visible and by way of which it is possible to input values such as by way of example temperatures, pressures etc. Sliders 48a are arranged below the option fields 46a. Regulating variables can be accurately set by way of the sliders 48*a*. One of the sliders 48*a* is used for the purpose of setting a level of aggression and the other slider 48*a* is used to set the impact energy. If an option field 46*a* is selected, the slider 48*a* is set corresponding to the regulating variable that is stored in the option field 46*a*. An actuating field 50*a* is arranged below the slider 48*a* on the display 40*a*. The regulating variables that are set by the sliders 48*a* are relayed from the data transmission unit 38*a* of the external programming unit 18*a* to the interface 16*a* of the electric tool 10*a* as a result of touching the actuating field 50*a*.

The electric tool 10*a* and the external programming unit 18*a* form a system.

Further exemplary embodiments are illustrated in FIGS. 2 to 4. The following descriptions are limited essentially to the differences between the exemplary embodiments, wherein in relation to components, features and functions that remain the same reference can be made to the description of the exemplary embodiment in FIG. 1. For the purpose of differentiating the exemplary embodiments, the letter a is replaced in the reference numerals of the exemplary embodiment in FIG. 1 by the letters b, c and d in the reference numerals of the exemplary embodiments of FIGS. 2 to 4. In relation to components that are described as identical, in particular in relation to components having identical reference numerals, it is also possible to refer fundamentally to the drawing and/or the description of the exemplary embodiment in FIG. 1.

FIG. 2 illustrates an alternative electric tool in accordance with the disclosure 10*b* having a control unit 12*b* that has control software and said software having control parameters. The control unit 12*b* is provided for the purpose of controlling a drive unit 14*b*. Furthermore, the electric tool 10*b* comprises an interface unit 16*b* that is provided for the purpose of fundamentally updating and/or modifying the control software and/or the control parameters. The interface unit 16*b* is arranged within the housing unit 24*b* of the electric tool 10*b*. The interface unit 16*b* is formed by a USB-connector.

The interface unit 16*b* is provided for the purpose of connecting the control unit 12*b* to an external programming unit 18*b*. The interface unit 16*b* is provided for the purpose of producing a wired-connection to the external programming unit 18*b*. The interface unit 16*b* is connected to the external programming unit 18*b* by way of a USB cable 52*b*. The external programming unit 18*b* is formed by a portable data processing system 22*b*. The external programming unit 18*b* is formed by a notebook computer. The external programming unit 18*b* comprises a data processing unit 36*b*, a data transmission unit 38*b*, a display 40*b* and an input unit 42*b*. The data transmission unit 38*b* is formed by a USB connector 54*b*.

The external programming unit 18*b* is provided for the purpose of implementing a method. The method is provided for the purpose of fundamentally updating and/or modifying a control software and/or control parameters of the control unit 12*b* of the electric tool 10*b*. In the method, user-defined and/or user specific data that is input into the external programming unit 18*b* and regulating variables for the control unit 12*b* of the electric tool 10*b* are transmitted to the control unit 12*b* of the electric tool 10*b* by way of the interface unit 16*b*. In addition, in the method, user-defined and/or user-specific data and regulating variables for the control unit 12*b* of the electric tool 10*b* are processed by way of the external programming unit 18*b* into control parameters for the control unit 12*b* of the electric tool 10*b*. It follows from this that the user-defined and/or user-specific data and the regulating variables are transmitted as control parameters to the control unit 12*b* of the electric tool 10*b*.

The control unit 12*b* of the electric tool 10*b* is provided for the purpose of implementing received control parameters.

As a result of touching an actuating field 50*b* of the external programming unit 18*b*, the regulating variables that are set by the sliders 48*b* are processed into control parameters by the data processing unit 36*b* of the external programming unit 18*b* and are relayed by way of the data transmission unit 38*b* of the external programming unit 18*b* to the interface unit 16*b* of the electric tool 10*b*.

FIG. 3 illustrates a further alternative electric tool in accordance with the disclosure 10*c* and a further alternative external programming unit 18*c*. The electric tool 10*c* comprises a control unit 12*c* that has control software and said control software having control parameters. The control unit 12*c* is provided for the purpose of controlling a drive unit 14*c*. Furthermore, the electric tool 10*c* comprises an interface unit 16*c* that is provided for the purpose of fundamentally updating and/or modifying the control software and/or the control parameters. The interface unit 16*c* is arranged within a housing unit 24*c* of the electric tool 10*c*. In addition, the interface unit 16*c* is connected to the control unit 12*c* of the electric tool 10*c* by way of a line 34*c*. The interface unit 16*c* is provided for the purpose of connecting the control unit 12*c* to the external programming unit 18*c*. The interface unit 16*c* is provided for the purpose of producing a wireless connection to the external programming unit 18*c*. The external programming unit 18*c* is formed by a portable data processing system 22*c*.

The electric tool 10*c* comprises a security device 20*c* that is provided for the purpose of authorizing a use of the interface unit 16*c*. The security device 20*c* is connected to the interface unit 16*c* by way of a line 44*c*. The security device 20*c* monitors incoming data in the case of the interface unit 16*c*. In the case of the incoming data, the security device 20*c* monitors whether said data comprises a signature that is known to the security device 20*c* in relation to the type of data. If the signature of the data is not known, the data is blocked and is not relayed to the control unit 12*c*. If the data comprises a known signature, the data is relayed to the control unit 12*c*. An authorization of the data can be performed in a graded manner by means of the security device 20*c*. The security device 20*c* comprises various authorization grades for this purpose and different groups of persons are allocated to said grades. Each known data signature is allocated a group of persons and each group of persons is allocated an authorization grade. Each authorization grade of the security device 20*c* is in each case allocated authorization access rights whose freedoms increase with each grade. In the highest authorization grade, all data is relayed by the security device 20*c*. With each lower grade, only specific data is relayed, other data is blocked. As far as authorization grades are concerned, the end user is allocated the lowest grade, the specialist dealer is allocated a middle grade and service personnel are allocated the highest grade.

The control unit 12*c* is provided for the purpose of processing and implementing received data into an additional functionality. The new functionality with its associated data is sent to the electric tool 10*c* by the external programming unit 18*c*. The data is processed by the control unit 12*c* and subsequently implemented as control parameters.

The external programming unit 18*c* is provided for the purpose of implementing a method. The method is provided for the purpose of fundamentally updating and/or modifying control software and/or control parameters of the control unit 12c of the electric tool 10c. In the method, functionalities of the electric tool 10c that are selected in the external programming unit 18c are transmitted by way of the interface unit 16c to the control unit 12c of the electric tool 10c. In addition, in the method, the functionalities of the electric tool 10c are processed into regulating variables for the control unit 12c of the electric tool 10c by way of the external programming unit 18c.

The external programming unit 18c is provided for the purpose of implementing a further method. The method is provided for the purpose of reading-out and processing data of the control unit 12c of the electric tool 10c by way of the interface unit 16c. The method is provided for the purpose of reading-out data that is specific to the application of the electric tool 10c by way of the interface unit 16c.

A user can download additional functions for the electric tool 10c to the external programming unit 18c by way of a website and/or by way of an internet sales portal and/or by way of software. All the downloaded functions are available in software, a user can where necessary to some degree set parameters of the function in this software. If the electric tool 10c is connected to the external programming unit 18c by way of the interface unit 16c, a user can select a desired function and transmit to the electric tool 10c by way of an actuating field 50c. These downloadable functions are allocated to the low authorization grades and it follows from this that said functions can already be used by an end user.

In this case, a drilling function is available. Control parameters of the control unit 12c of the electric tool 10c are set in such a manner that a torque or rather a rotational speed while starting up is achieved in a decelerated manner in order to render possible to drill in a targeted manner. In this case, a user can to some degree set parameters relating to duration period within which the torque or rather the rotational speed is built-up. Fundamentally however other parameters that can be set and that appear expedient to the person skilled in the art are feasible. In addition, a temperature protection function is available. In the case of the function, during an operation, in particular in the case of critical components, temperatures are estimated and where necessary protection mechanisms are activated and/or the device is entirely deactivated. As a consequence, it is possible in particular to achieve a long serviceable life of the electric tool 10c. Furthermore, an over-head function is available. In this case, control parameters of the control unit 12c of the electric tool 10c are adjusted in order to render possible an over-head operation of the electric tool 10c. Fundamentally, however, other functions that appear expedient to the person skilled in the art are also feasible.

The software of the external programming unit 18c furthermore comprises the possibility of an adjustment that is specific to the application. If the electric tool 10c is connected to the external programming unit 18c by way of the interface unit 16c, a user can start an adjustment that is specific to the application at the external programming unit 18c. During the start, the data that is specific to the application of the electric tool 10c can be read-out from the external programming unit 18c by way of the interface unit 16c. The data that is specific to the application is continuously stored by the control unit 12c of the electric tool 10c onto a memory unit 56c of the electric tool 10c during an operation. The read-out data is subsequently processed by the external processing unit 18c. After processing, specific, optimized control parameters are calculated by the external programming unit 18c for the electric tool 10c and are transmitted to the electric tool 10c. The adjustment that is specific to the application is allocated to a high authorization grade and it follows from this that only service personnel can perform said adjustment. Fundamentally, it would also be in particular feasible for an adjustment that is specific to the application to only be possible at an authorized service computer and/or at a central computer.

The duration of use of functions is stored on the memory unit 56c by the control unit 12c for the adjustment that is specific to the application. If, by way of example, in the case of the electric tool 10c only a hammer function is used and not a drill function, a start-up time is reduced during the adjustment since for the hammer function a steady start-up is not required.

FIG. 4 illustrates a further alternative electric tool in accordance with the disclosure 10d and a further alternative external programming unit in accordance with the disclosure 18d. The electric tool 10d is formed by a cordless screwdriver. The electric tool 10d comprises a control unit 12d that has control software and said control software having control parameters. The control unit 12d is provided for the purpose of controlling a drive unit 14d. Furthermore, the electric tool 10d comprises an interface unit 16d that is provided for the purpose of fundamentally updating and/or modifying the control software and/or the control parameters. The interface unit 16d is arranged within a housing unit 24d of the electric tool 10d. In addition, the interface unit 16d is connected to the control unit 12d of the electric tool 10d by way of a line 34d. The interface unit 16d is provided for the purpose of connecting the control unit 12d to the external programming unit 18d and at least the further device 58d. The interface unit 16d is provided for the purpose of producing a wireless connection to the external programming unit 18d and at least one further device 58d. The interface unit 16d comprises an NFC-interface element that is not further visible and a GSM-interface element that is not further visible. In addition, the electric tool 10d comprises a switching element 60d. The switching element 60d is formed by a rotary switch. The switching element 60d is connected to the control unit 12d.

The control unit 12d is provided for the purpose of processing and implementing received data relating to a specific application. The specific application with its associated data is sent to the electric tool 10d by the external programming unit 18d. The data is processed by the control unit 12d and is subsequently implemented as control parameters.

The external programming unit 18d is provided for the purpose of implementing a method. The method is provided for the purpose of fundamentally updating and/or modifying control software and/or control parameters of the control unit 12d of the electric tool 10d. In the method, specific applications of the electric tool 10d that are selected in the external programming unit 18d are transmitted to the control unit 12d of the electric tool 10d by way of the interface unit 16d. In addition, in the method, the applications of the electric tool 10d are processed into regulating variables for the control unit 12d of the electric tool 10d by way of the external programming unit 18d.

A user can download additional applications of the tool of the electric tool 10d to the external programming unit 18d by way of a website and/or by way of an internet sales portal and/or by way of software. All the downloaded applications of the tool are illustrated in software. If the electric tool 10d is connected to the external programming unit 18d by way of the interface unit 16d, a user can select a desired application of the tool and transmit to the electric tool 10d by way of an actuating field 50d. A user can where necessary modify parameters of an application by way of the switching element 60d. Depending upon the application being carried out a setting possibility can be modified by means of the switching element 60d.

Fundamentally, it would be feasible for the switching element 60d to comprise an allocated display on which are displayed the setting possibilities currently available to the switching element 60d.

There are various applications that can be carried out by the electric tool 10d. There is an application for drilling holes of a specific depth and said application is based upon a user applying a constant pressure. In addition, there is a specific screw application such as identifying that a screw head of a screw that is to be screwed in has been countersunk. After an identification process, the drive unit 14d of the electric tool 10d is automatically switched off. Furthermore, there is a screw application for the purpose of screwing in a screw in a defined manner. In this case, a screw is screwed in with the defined rotational speed so that said screw protrudes. A setting of the screwing depth is performed by way of the switching element 60d. Fundamentally, however, an input would also be feasible by way of a learning mode, in other words a user carries out a rotational speed curve, in particular in the first screw, and said rotational speed curve is automatically repeated by the electric tool 10d.

The not further visible GSM interface element of the interface unit 16d is provided for the purpose of implementing a method. The method is provided for the purpose of providing automated communication with the outside world. The method is provided for the purpose of providing automated communication with the outside world if it is necessary to perform maintenance work. In the method, a state of the electric tool 10d is monitored by way of an internal diagnosis unit, not further visible, in order to check whether maintenance work is required. If maintenance work is required, the electric tool 10d automatically notifies a set telephone number. Fundamentally, it would also be feasible to replace the internal diagnosis device with an operating hours counter that determines the necessity of maintenance work by way of the operating hours of the electric tool 10d.

The invention claimed is:

1. A hand-held power tool comprising:
    a motor configured to drive the hand-held power tool;
    a control unit having a processor and a memory, the memory being configured to store control software and control parameters;
    an interface operably connected to the control unit and configured to receive configuration data from an external programming unit and provide the configuration data to the control unit, wherein the processor of the control unit is configured to:
        receive the configuration data from the interface, the configuration data including at least one of (i) user-defined data regarding a specific application of the hand-held power tool, the specific application including at least one of a material of a workpiece and a task to be performed on the workpiece, (ii) user-defined data regarding an environmental condition of the hand-held power tool, and (iii) at least one of user-defined and user-specific data regarding a tool behavior of the hand-held power tool, the tool behavior including at least one of an aggressive behavior, a behavior having a high impact energy, and a low vibration behavior;
        process the at least one of (i) the data regarding the specific application, (ii) the data regarding the environmental condition, and (iii) the data regarding the tool behavior to provide modified control parameters that take into account at the least one of (i) the specific application, (ii) the environmental condition, and (iii) the tool behavior;
        replace the control parameters that are currently stored in the memory with the modified control parameters;
        control the motor using the control software and the modified control parameters; and
    at least one security device operably connected to the interface and configured to:
        determine an authorization of the external programming unit;
        authorize a use of the interface when the external programming unit has authorization; and
        block the use of the interface when the external programming unit does not have authorization.

2. The hand-held power tool as claimed in claim 1, wherein the interface includes a wireless transceiver configured to establish a wireless connection with the external programming unit.

3. The hand-held power electric tool as claimed in claim 1, wherein the at least one security device is configured to determine the authorization in a graded manner.

4. The hand-held power tool as claimed in claim 1, wherein:
    the configuration data includes user-defined regulating variables; and
    the control unit is configured to control the motor based on the user-defined regulating variables.

5. The hand-held power tool as claimed in claim 1, wherein:
    the configuration data includes the user-defined data regarding the specific application of the hand-held power tool; and
    the control unit is configured to control the motor based on the user-defined data regarding the specific application of the hand-held power tool.

6. The hand-held power tool as claimed in claim 1, wherein:
    the configuration data includes the user-defined data regarding the environmental condition; and
    the control unit is configured to control the motor based on the user-defined data regarding the environmental condition.

7. The hand-held power tool as claimed in claim 1, wherein:
    the configuration data includes the at least one of user-defined and user-specific data regarding the behavior of the hand-held power tool; and
    the control unit is configured to control the motor based on the at least one of user-defined and user-specific data regarding the behavior of the hand-held power tool.

8. The hand-held power tool as claimed in claim 1, wherein:
    the configuration data includes data relating to an additional functionality of the hand-held power tool; and
    the control unit is configured to control the motor based on the data relating to the additional functionality of the hand-held power tool.

9. A method for modifying control parameters of a control unit of hand-held power tool, the hand-held power tool comprising (i) a motor configured to drive the hand-held power tool, (ii) the control unit, the control unit having a processor and a memory, the memory being configured to store control software and control parameters, and (iii) an interface operably connected to the control unit, the method comprising:

receiving configuration data from an external programming unit at the interface; the configuration data including at least one of (i) user-defined data regarding a specific application of the hand-held power tool, the specific application including at least one of a material of a workpiece and a task to be performed on the workpiece, (ii) user-defined data regarding an environmental condition of the hand-held power tool, and (iii) at least one of user-defined and user-specific data regarding a tool behavior of the hand-held power tool, the tool behavior including at least one of an aggressive behavior, a behavior having a high impact energy, and a low vibration behavior;

providing the configuration data to the control unit with the interface;

receiving, with the processor of the control unit, the configuration data from the interface;

processing, with the processor of the control unit, the at least one of (i) the data regarding the specific application, (ii) the data regarding the environmental condition, and (iii) the data regarding the tool behavior to provide modified control parameters that take into account at the least one of (i) the specific application, (ii) the environmental condition, and (iii) the tool behavior;

replacing, with the processor of the control unit; the control parameters that are currently stored in the memory with the modified control parameters;

controlling, with the processor of the control unit, the motor using the control software and the modified control parameters; and wherein the hand-held power tool further includes at least one security device operably connected to the interface and configured to:

determine an authorization of the external programming unit;

authorize a use of the interface when the external programming unit has authorization; and block the use of the interface when the external programming unit does not have authorization.

10. The method as claimed in claim 9, further comprising:
transmitting the configuration data from the external programming unit to the interface, the configuration data being at least one of user-defined data that is input into the external programming unit, user-specific data that is input into the external programming unit, and regulating variables for the control unit of the hand-held power tool.

11. The method as claimed in claim 10, further comprising:
converting, with a processor of the external programming unit, at least one of the user-defined and the user-specific data for the control unit of the hand-held power tool into regulating variables for the control unit of the hand-held power tool.

12. The method as claimed in claim 9, further comprising:
transmitting the configuration data from the external programming unit to the interface, the configuration data relating to at least one of an additional functionality and a specific application for the control unit of the hand-held power tool.

13. A hand-held power tool comprising:
a motor configured to drive the hand-held power tool;
a control unit having a processor and a memory, the memory being configured to store control software and control parameters; and
an interface operably connected to the control unit and configured to receive configuration data from an external programming unit and provide the configuration data to the control unit, wherein the processor of the control unit is configured to:

receive the configuration data from the interface, the configuration data including at least one of user-defined and user-specific data regarding a tool behavior of the hand-held power tool, the tool behavior including at least one of an aggressive behavior, a behavior having a high impact energy, and a low vibration behavior;

process the data regarding the tool behavior to provide modified control parameters that take into account the tool behavior;

replace the control parameters that are currently stored in the memory with the modified control parameters;

control the motor using the control software and the modified control parameters; and at least one security device operably connected to the interface and configured to:
determine an authorization of the external programming unit;
authorize a use of the interface when the external programming unit has authorization; and
block the use of the interface when the external programming unit does not have authorization.

* * * * *

UNITED STATES PATENT AND TRADEMARK OFFICE
CERTIFICATE OF CORRECTION

PATENT NO. : 9,652,217 B2
APPLICATION NO. : 14/403204
DATED : May 16, 2017
INVENTOR(S) : Winkler et al.

Page 1 of 1

It is certified that error appears in the above-identified patent and that said Letters Patent is hereby corrected as shown below:

In Column 14, Lines 6-7, Lines 31-32 of Claim 1 should be corrected as follows:
replace the control parameters that are currently stored
    in the memory with the modified control parameters; and In Column 14, Lines 23-25, Lines 1-3 of Claim 3 should be corrected as follows:
3. The hand-held power tool as claimed in claim
1, wherein the at least one security device is configured to
determine the authorization in a graded manner.

In Column 15, Lines 29-34, Lines 34-39 of Claim 9 should be corrected as follows:
replacing, with the processor of the control unit, the
    control parameters that are currently stored in the
    memory with the modified control parameters; and
controlling, with the processor of the control unit, the
    motor using the control software and the modified
    control parameters, In Column 16, Lines 36-37, Lines 20-21 of Claim 13 should be corrected as follows:
replace the control parameters that are currently stored in
    the memory with the modified control parameters; and Signed and Sealed this
Thirty-first Day of July, 2018

Andrei Iancu
*Director of the United States Patent and Trademark Office*